(12) United States Patent
Tavakkoli et al.

(10) Patent No.: US 8,992,875 B2
(45) Date of Patent: Mar. 31, 2015

(54) PRODUCTION OF HIGH PURITY PRECIPITATED CALCIUM CARBONATE

(75) Inventors: Bahman Tavakkoli, Puch (AT); Jörg Sötemann, Villach (AT); Michael Pohl, Villach (AT); Thomas Schmölzer, Villach (AT)

(73) Assignee: Omya International AG, Oftringen (CH)

(*) Notice: Subject to any disclaimer, the term of this patent is extended or adjusted under 35 U.S.C. 154(b) by 96 days.

(21) Appl. No.: 13/879,492

(22) PCT Filed: Oct. 20, 2011

(86) PCT No.: PCT/EP2011/068319
§ 371 (c)(1),
(2), (4) Date: Jun. 13, 2013

(87) PCT Pub. No.: WO2012/055750
PCT Pub. Date: May 3, 2012

(65) Prior Publication Data
US 2013/0336859 A1  Dec. 19, 2013

Related U.S. Application Data

(60) Provisional application No. 61/409,202, filed on Nov. 2, 2010.

(30) Foreign Application Priority Data

Oct. 26, 2010  (EP) .................................... 10188840

(51) Int. Cl.
*C01F 11/18* (2006.01)
*C22B 3/10* (2006.01)
*C09C 1/02* (2006.01)

(52) U.S. Cl.
CPC ............. *C01F 11/185* (2013.01); *C01F 11/18* (2013.01); *C01P 2004/61* (2013.01); *C01P 2004/62* (2013.01); *C01P 2006/60* (2013.01); *C09C 1/021* (2013.01); *C01P 2006/12* (2013.01)
USPC ..................................................... 423/432

(58) Field of Classification Search
CPC .................. C01F 11/18; C22B 3/10
USPC .......................................... 423/431, 162, 165
See application file for complete search history.

(56) References Cited

U.S. PATENT DOCUMENTS

| 4,793,979 A | 12/1988 | Wenxing |
| 5,695,733 A | 12/1997 | Kroc et al. |
| 2010/0129282 A1 | 5/2010 | Korner et al. |

FOREIGN PATENT DOCUMENTS

| CN | 1058005 A | 1/1992 |
| CN | 1757597 A | 4/2006 |
| CN | 101139734 A | 3/2008 |
| DE | 1957864 A1 | 9/1970 |
| ES | 373542 A1 | 2/1972 |
| FR | 998063 | 1/1952 |
| FR | 1603527 | 6/1971 |
| GB | 1080729 | 8/1967 |
| JP | 62036021 | 2/1987 |
| JP | 2007161515 A | 6/2007 |
| JP | 2010222220 A | 10/2010 |

OTHER PUBLICATIONS

Thomson Scientific, London: XP-002619581, Oct. 7, 2010 abstract.
The International Search Report for PCT Application No. PCT/EP2011/068319.
The Written Opinion of the International Searching Authority for PCT Application No. PCT/EP2011/068319.
The Office Action, dated Jul. 16, 2014 for related Chinese Application No. 201180051718.8.
The Office Action, dated Oct. 16, 2014 for related Columbian Application No. 56329.

*Primary Examiner* — Stuart Hendrickson
(74) *Attorney, Agent, or Firm* — Amster, Rothstein & Ebenstein LLP

(57) ABSTRACT

The present invention relates to a process for the preparation of precipitated calcium carbonate comprising the steps of a) providing and calcining calcium carbonate comprising material; b) slaking the reaction product obtained from step a) with an aqueous ammonium chloride solution; c) separating insoluble components from the calcium chloride solution obtained from step b); d) carbonating the calcium chloride solution obtained from step c); e) separating the precipitated calcium carbonate obtained from step d); the precipitated calcium carbonate obtained by this process, as well as uses thereof.

44 Claims, 1 Drawing Sheet

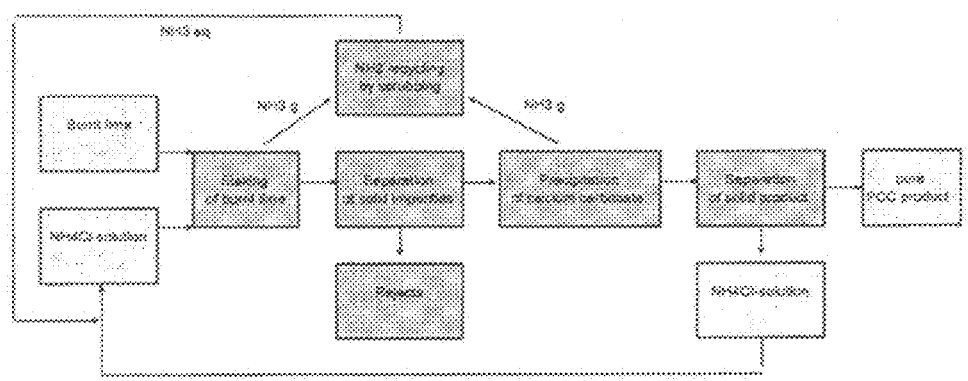

PRODUCTION OF HIGH PURITY PRECIPITATED CALCIUM CARBONATE

CROSS-REFERENCE TO RELATED APPLICATIONS

This application is a U.S. national phase of PCT Application No. PCT/EP2011/068319, filed Oct. 20, 2011, which claims priority to European Application No. 10188840.2, filed Oct. 26, 2010 and U.S. Provisional Application No. 61/409,202, filed Nov. 2, 2010.

The present invention relates to a process for the production of high purity precipitated calcium carbonate, the high purity precipitated calcium carbonate obtained by this process, as well as its use.

Calcium carbonate is one of the most commonly used additives in the paper, paint and plastics industries. While naturally occurring ground calcium carbonate (GCC) is usually used as a filler in many applications, synthetically manufactured precipitated calcium carbonate (PCC) may be tailor-made with respect to its morphology and particle size allowing this materials to fulfil additional functions.

However, commonly known PCC production processes including the steps of calcining crude calcium carbonate, slaking it with water, and subsequently precipitate calcium carbonate by passing carbon dioxide through the resulting calcium hydroxide suspension, need high quality starting materials as there is no reasonable method to separate impurities from the raw material during this process.

There are numerous approaches in the prior art to produce calcium carbonate having certain properties such as high purity, most of which however are focussing on this one property only, whereas the processes do not allow to fully control also other properties such as crystal shape, particle size etc., or high amounts of rejects are often produced by such known processes.

In Chinese patent application No. 1757597, a process for preparing porous superfine calcium carbonate is described. This is achieved by preparing an aqueous solution of calcium chloride, as well as, separately, an aqueous solution of ammonium hydrogen carbonate and carbon dioxide, and reacting these solutions in a colliding reaction, being a rather complex reaction in practise, while controlling flow and temperature, resulting in the formation of porous superfine precipitated calcium carbonate having a high specific surface area. The mother liquid containing ammonium chloride is reused for solving calcium chloride therein, but the ammonium chloride is not used as a reactant as such. Thus, the process according to CN 1757597 starts with a high quality starting material, wherein high porosity and high fineness particularly are achieved by the specific type of colliding reaction. The reject, inter alia ammonium chloride solution, is not reused as a reactant, but simply as a solvent, which will lead to an enrichment of ammonium carbonate not only in the solution, but also in the final product, until it is separated. No mention is made in this document as to obtaining precipitated calcium carbonate having a high purity and defined crystal structure.

Japanese patent application JP 2007-161515 is directed to a method for producing calcium carbonate, in which the content of impurities, particularly, the content of strontium is reduced. The method comprises the following steps: (A) a dissolution step, where an aqueous solution of hydrochloric acid, nitric acid, ammonium chloride or ammonium nitrate is added to an aqueous suspension, so as to dissolve calcium hydroxide; (B) a precipitation step, where aqueous ammonia is added to the solution of a calcium salt obtained in the dissolution stage, and the pH of the liquid is increased to more than 12, so as to precipitate impurities together with the precipitation of calcium hydroxide; (C) a solid-liquid separation step, where the precipitated impurities and an aqueous solution of calcium salt are separated; (E) a precipitation step, where carbon dioxide gas is blown into the separated aqueous solution of calcium salt, so as to precipitate calcium carbonate; and (F) a recovering step, where the precipitated calcium carbonate is recovered. Thus, the process of JP 2007-161515 is a rather complicated and not really environmentally friendly one using such compounds such as hydrochloric and nitric acid, and nitrates, which are not returned into the reaction cycle. Furthermore the separation of co-precipitated metal hydroxides from calcium hydroxide is done based on the different dissolution behaviour of the hydroxides at elevated temperatures, which is not very precise and requires a high energy consumption. Furthermore, no information is given how to obtain specific crystal structures of the precipitated calcium carbonate.

Thus, there is a continuous need for processes providing high purity PCC with defined structures, and allowing for a control of several desired properties of PCC, wherein the starting material may be a low quality material, which otherwise would be deposited due to its low quality, which is advantageous especially from an environmental point of view and with respect to increasing demands for sustainable processes.

As well, it is an object of the present invention on the one hand to produce as little rejects as possible, on the other hand to reuse as much rejects as possible, which may be recycled or fed to other applications.

It was surprisingly found that by the process of the present invention low quality carbonates can be transformed into very pure precipitated calcium carbonates with an excellent brightness and defined structure.

Thus, according to the process of the present invention, it is possible to separate essentially all impurities from the starting material regardless of the quality or types of raw material.

Accordingly, the above object is solved by a process for the preparation of precipitated calcium carbonate comprising the steps of
  a) providing and calcining calcium carbonate comprising material;
  b) slaking the reaction product obtained from step a) with an aqueous ammonium chloride solution;
  c) separating insoluble components from the calcium chloride solution obtained from step b);
  d) carbonating the calcium chloride solution obtained from step c);
  e) separating the precipitated calcium carbonate obtained from step d).

The process according to the present invention provides a high purity precipitated calcium carbonate, wherein mineral impurities present in the feed material are readily separated, and wherein essentially no undesired by-products or waste are produced.

The chemical reactions underlying the above process may be summarized as follows, wherein "Imp" means the amount of undesirable, mostly colouring impurities:

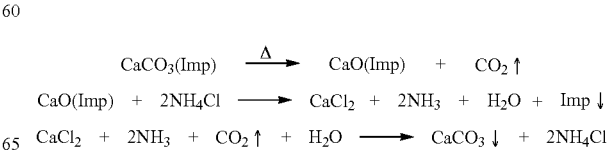

In step a), a feed material is provided, which comprises calcium carbonate, and is calcined. Calcination is a thermal treatment process applied to calcium carbonate containing materials in order to bring about a thermal decomposition resulting in the formation of calcium oxide and gaseous carbon dioxide.

It is a special advantage of the present invention that for this purpose also low quality calcium carbonate comprising materials may be used, which usually are not suitable for the production of high quality fillers and pigments, and therefore are deposited as waste material.

Calcium carbonate comprising materials which may be used as feed materials in the present process may be any calcium carbonate comprising materials such as those selected from the group comprising precipitated calcium carbonates; natural calcium carbonate containing minerals such as marble, limestone and chalk, and mixed alkaline earth carbonate minerals comprising calcium carbonate such as dolomite, or calcium carbonate rich fractions from other sources, any one of which may comprise varying impurities, e.g. such which may be burnt to carbon dioxide, e.g. graphite or other organic impurities, or, especially, impurities being insoluble in an alkaline ammoniac environment, such as silicates, iron oxides, or iron hydroxides.

Generally, in the context of the present invention the term "impurity" refers to any component not being calcium carbonate.

For reasons of efficiency, it is preferred that the feed material has a minimum calcium carbonate content of at least 15 wt %, more preferably of at least 50 wt %, especially of at least 75 wt %, and most preferably of at least 90 wt %, e.g. 98 wt % based on the total weight of the feed material.

Calcium carbonate decomposes at about 1000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by x-ray diffraction, or the slaking reactivity by common methods.

Subsequently, contrary to usual PCC production processes using only water for slaking calcium oxide resulting in the formation of insoluble calcium hydroxide, according to the process of the present invention, step b) is carried out by combining calcium oxide obtained from step a) with an aqueous solution of ammonium chloride, resulting in the formation of highly soluble calcium chloride, whereas undesired impurities initially contained in the calcium carbonate feed material remain insoluble or are at least less soluble than calcium chloride in the resulting alkaline ammoniac medium allowing a separation.

The ammonium chloride used in the process of the present invention may be any commercially available product.

The concentration of the ammonium chloride solution is essentially uncritical. However, for efficiency reasons, it is preferred that it is rather high, e.g. 200 g ammonium chloride per liter water.

With respect to the amount of calcium oxide, the molar ratio of ammonium chloride to calcium oxide preferably is from 1:1 to 8:1, more preferably from 1.5:1 to 4:1, e.g. from 2:1 to 3:1.

The progress of the reaction may be observed by measuring the conductivity of the reaction mixture, which initially quickly decreases and reaches an essentially constant level as soon as the reaction is completed. As well, it may be monitored by temperature and turbidity control.

In step c), the impurities are separated as insoluble components in the alkaline calcium chloride solution formed in step b), which may be achieved by screening or sedimentation and decanting, and/or filtration.

It may be especially preferable to carry out microfiltration (separation of particles >0.6 µm) or even nanofiltration (separation of particles >0.01 µm) subsequent to any one of these separation steps, especially after sedimentation and decanting, in order to separate colloidal colouring impurities and undesired crystal seeds, and to obtain products of an even higher brightness. The mentioned techniques may be carried out by means of any known equipment for such purposes.

The insoluble components may be flocculated before removing them, by addition of high molecular flocculants known in the art for such purposes, wherein cationic, anionic flocculants, and/or non-ionic flocculants, preferably copolymers based on poly acrylic acid may be used. It is however preferred to use anionic flocculants providing a flocculation of impurities such as iron hydroxide preferably within seconds.

The flocculants may be added in an amount of from 1 to 50 ppm, preferably of from 2 to 40 ppm, more preferably of from 3 to 25 ppm, and most preferably of from 5 to 15 ppm, based on dry CaO.

After separation, a clear and almost colourless concentrate of readily soluble calcium chloride is obtained.

Impurities which may be separated in step c) e.g. are impurities being insoluble or poorly soluble in an alkaline ammoniac environment, such as silicates, iron oxides, iron hydroxides, magnesium chloride, etc., and even manganese or strontium ions may be enriched in the reject.

It is a further advantage of the process of the present invention that these impurities, which are separated from the reaction cycle as reject, may be used in other applications e.g. as base material for fertilizers or soil conditioners, as they contain high amounts of ammonium chloride compounds. Other applications could be catalysts, e.g. in applications of fuller's earth, or in any other uses, where e.g. finely dispersed iron (oxide) is advantageously used as catalyst.

In step d), the carbonation of the calcium chloride-solution obtained from step c) results in precipitation of pure calcium carbonate.

The carbonation may be carried out by feeding pure gaseous carbon dioxide or technical gases containing at least 10 vol.-% of carbon dioxide into the alkaline calcium chloride solution. In this respect, it is possible to use any technical flue gases, provided that they do not contain any components causing undesired side reaction, or introducing new impurities in the process of the present invention, such as heavy metals or sulphurous components.

The carbonation is carried out by means and under conditions well-known by the person skilled in the art.

The introduction of carbon dioxide into the alkaline calcium chloride solution quickly increases the carbonate ion ($CO_3^{2-}$) concentration and calcium carbonate is formed.

Particularly, the carbonation reaction can be readily controlled considering the reactions involved in the carbonation process. Carbon dioxide dissolves according to its partial pressure forming carbonate ions via the formation of carbonic acid ($H_2CO_3$), and hydrogen carbonate ions ($HCO_3^-$) being unstable in the alkaline solution. Upon continued dissolution of carbon dioxide, hydroxide ions are consumed and the concentration of carbonate ions increases until the concentration of dissolved calcium carbonate exceeds the solubility product and solid calcium carbonate precipitates.

There might occasionally be an oversaturation retarding precipitation, which is due to a decrease of the carbonate ion concentration, while the hydrogen carbonate ion concentration increases and subsequently calcium hydrogen carbonate cations ($CaHCO_3^+$) are formed being more soluble than calcium carbonate.

Consequently, the yield of precipitated calcium carbonate might not be 100% of the theoretical value. The yield could be raised to 100% by an excess of ammonia leading to a higher carbonate anion concentration. It is, however, preferred that the process according to the present invention is conducted as a closed process wherein any one of the reactants may be recycled into the process, e.g. unreacted calcium chloride and/or ammonium chloride can be directly returned into step b) of the process.

In a special embodiment, seed crystals may be added to the calcium chloride-solution obtained from step c) before precipitation in order to ensure that the precipitation products crystallize in a certain shape and particle size range.

The seed crystals may be added in an amount of from 0.1 to 10 wt %, preferably in an amount of from 0.1 to 8 wt %, more preferably in an amount of from 0.2 to 5 wt %, most preferably in an amount of from 0.5 to 2 wt %, e.g. 1 wt %, based on the weight of CaO.

It is especially preferred that the mother liquor obtained after precipitation is completely recycled, which, as mentioned, may advantageously be achieved by a closed system reducing emissions almost completely.

The progress of the carbonation reaction can be readily observed by measuring the conductivity density, turbidity and/or pH.

In this respect, the pH of the calcium chloride-solution before addition of carbon dioxide will be more than 10 and will constantly decrease until a pH of about 7 is reached. At this point the reaction can be stopped.

Conductivity slowly decreases during the carbonation reaction and rapidly decreases to low levels, when the precipitation is completed.

The precipitated calcium carbonate obtained from step d) may be separated from the mother liquor by any conventional means of separation such as filtration, e.g. by means of drum filters, filter press etc.

After separation, the precipitated calcium carbonate may still contain some water, as well as dissolved ions coming from ammonium chloride and calcium chloride.

Residual ammonium chloride and calcium chloride, or their respective ions should advantageously be removed from the precipitated calcium carbonate due to their corrosive potential, odour, and their possibly negative effects in applications such as e.g. paper, paint or plastic applications.

The removal of readily soluble ammonium chloride and calcium chloride, however, is easily done by simply washing the precipitate with water, preferably water heated up to the boiling point, and optionally under stirring, and subsequent separation of the precipitated calcium carbonate from the aqueous phase by suitable separation methods known by the person skilled in the art, such as filtration, wherein the washing step may be repeated until the desired purity level is reached.

After washing, the precipitated calcium carbonate may be up concentrated to obtain a slurry, which may be used, e.g. in paper applications, or dried, e.g. in an oven at 100° C. without decomposition or change of the product and crystal form, the dried product being especially useful, e.g. in plastic applications.

The precipitated calcium carbonate may be further processed, e.g. may be deagglomerated or subjected to a dry grinding step. Otherwise, it may also be wet ground in the form of a slurry.

As mentioned above the process according to the present invention preferably is a closed process, which may be conducted batch wise or continuously.

Thus, any one of the reactants may be recycled into the process. In an advantageous embodiment, even the carbon dioxide produced in step a) can be recycled into the closed reaction cycle in step d). Also, exhaust ammonia may be recycled into the process, wherein any one of the gaseous components advantageously are led through conventional scrubbers for purification reasons, when they are recycled.

The precipitated calcium carbonate obtained by the process of the present invention preferably contains less than 0.5 wt % impurities (i.e. components other than calcium carbonate), more preferably less than 0.3 wt %, especially less than 0.1 wt %, and most preferably less than 0.05 wt % impurities.

The precipitated calcium carbonate may have aragonitic, calcitic, or vateritic crystal structure, or mixtures thereof. It is a further advantage of the present invention that the crystal structure and morphology of the precipitated calcium carbonate can be controlled, e.g. by addition of seed crystals or other structure modifying chemicals.

The purity of the desired mineral phase may be higher than 90 wt %, and even higher than 95 wt %, especially if corresponding seed crystals are used.

Thus, especially aragonitic PCC can be obtained in a very high purity using corresponding seed crystals, such as, e.g. ultrafine ground aragonitic calcium carbonate products.

Without seed crystals the formation of vateritic structures will be favoured recrystallizing in the absence of any stabilising agents to calcitic structures.

The high purity of the precipitated calcium carbonate obtained from the process of the present invention leads to excellent optical properties, especially high brightness and low yellow index, measured by means of an Elrepho spectrometer available from Datacolor calibrated with a barium sulphate standard according to standard procedures.

Thus, the products obtained by the process of the present invention may have a TAPPI brightness (R457) of at least 88, preferably at least 90, more preferably at least 92, e.g. from 95 to 99 such as 97.

The luminous reflectance factor $R_y$ of the precipitated calcium carbonate obtained by the process of the present invention preferably has a value of at least 90, preferably at least 92, more preferably at least 95, e.g. from 96 to 99, such as 98.

The yellow index (calculated by the formula $I=100*(R_x-R_z)/R_y$) of the precipitated calcium carbonate obtained by the process of the present invention preferably has a value of from 0.5 to 6, more preferably of from 0.7 to 3, most preferably of from 1 to 2.

Furthermore, a small particle size may be achieved by the process of the present invention. Thus, the precipitated calcium carbonate obtained by the process of the present invention may have a weight median diameter $d_{50}$ of not more than 20 μm, preferably not more than 10 μm, more preferably of not more than 5 μm, most preferably of not more than 2 μm, e.g. not more than 1 μm.

For the determination of the weight median particle size $d_{50}$ a Sedigraph 5100 device from the company Micromeritics, USA was used. The measurement was performed in an aqueous solution of 0.1 wt-% $Na_4P_2O_7$. The samples were dispersed using a high-speed stirrer and ultrasound.

The possibility of obtaining such small particle sizes according to the invention is due to the high purity of the material. It can further be controlled by applying a high carbon dioxide partial pressure during precipitation of the calcium carbonate, as well as by high mechanical shearing during the precipitation step or thereafter by high stirring rates.

Thus, it is even possible to obtain structured particles having a weight median particle diameter in the nanometer range.

In this respect, it is also possible to obtain precipitated calcium carbonate having a very narrow particle size distribution, which may be further improved by the use of certain crystallisation blocking additives such as oil or sugar based chemicals, or careful deagglomeration by means of grinding, ultrasound and the like.

The BET specific surface area of the precipitated calcium carbonate obtained by the process of the present invention may be controlled by the use of additives, e.g. surface active agents, shearing during the precipitation step or thereafter at high mechanical shearing rates not only leading to a low particle size, but also to a high BET specific surface area.

The BET specific surface area of the precipitated calcium carbonate obtained by the process according to the present invention may be from 1 to 100 $m^2/g$, preferably from 5 to 70 $m^2/g$, more preferably from 10 to 50 $m^2/g$, especially from 15 to 30 $m^2/g$, e.g. from 18 to 20 $m^2/g$, measured using nitrogen and the BET method according to ISO 9277.

Due to the above described properties of the precipitated calcium carbonate obtained by the process according to the present invention, which can be readily controlled as desired, it is a further aspect of the present invention to use these precipitated calcium carbonates in applications such as paint or plastic applications, as well as in paper applications.

The precipitated calcium carbonate obtained by the process according to the present invention may be advantageously used as fillers and/or pigments in plastics, such as in breathable films, paints and papers.

The FIGURES described below, and the following examples and experiments, serve to illustrate the present invention and should not restrict it in any way.

DESCRIPTION OF THE FIGURES

FIG. 1 shows a principal flow sheet of a setup for the process of the present invention.

EXAMPLES

In the following examples the process according to the present invention is exemplified, and product properties of the precipitated calcium carbonates obtained by this process are described:

1. Basic Setup for Carrying Out the Present Invention

In FIG. 1, a schematic illustration of an advantageous embodiment of how the process of the present invention may be conducted in principle is given by a flow sheet, also comprising optional steps such as recycling ammonia into the process including scrubbing and washing in order to purify exhaust gases and the precipitated calcium carbonate product.

For the following examples low grade qualities of chalk and limestone from different quarries were chosen as feed material, which, usually, are not suitable for the preparation of common PCC qualities. Among these materials, a waste material from a screening step of a marble feed stone (so called "Riesel") was selected.

While chalk and limestone feed materials was crushed to obtain a suitable feed size of 1 to 8 mm for the process of the present invention, the Riesel material was screened at 1 mm to remove clay minerals.

2. Preparation and Characterization of Products Obtained by the Process of the Present Invention.

For determining the purity of the product obtained by the process and thus of the efficiency of the process of the present invention, the precipitated calcium carbonate was prepared as follows and its chemical composition, as well as the ones of the feed material and the reject was determined and summarized in the following table.

2.1. Preparation of High Purity PCC from Different Materials and Characterization with Respect to Brightness and Yellow Index 2.1.1. Preparation For the following lab trials, several different feed materials were used in the process of the present invention and subsequently analysed with respect to their optical properties:

Feed Material
Sample No. 1: Riesel 1-4 mm Gummern (Austria)
Sample No. 2: Chalk Harmignies (Belgium)
Sample No. 3: Chalk ordinaire Omey (France)
Sample No. 4: Chalk Mjelnik (Poland)
Sample No. 5: Riesel 1-4 mm Gummern (Austria)
Sample No. 6: Fe-rich marble Gummed (Austria)
Sample No. 7: Limestone Burgberg (Germany)
Sample No. 8: Limestone Vollmer (Germany)

a) 5000 g of the respective feed material was calcined in a lab furnace at a temperature of 1000° C. for 2 hours.

b) 400 g of the burnt limestone obtained from the calcining step was fed into an 8 l reactor, which was previously fed with 800 g ammonium chloride dissolved in 4 l water. The reaction mixture was slaked under stirring at room temperature for 30 minutes, while the temperature of the solution decreased.

c) Subsequently, insoluble components were separated from the resulting calcium chloride solution by screening at 100 μm. The separated reject was analysed, as mentioned below.

d) The calcium chloride solution obtained was fed into a precipitation reactor, into which pure gaseous carbon dioxide was fed from a storage tank under stirring at a starting temperature of 40° C. When the reaction was completed, which was determined by pH control, the precipitated calcium carbonate was separated by filtration, the filtrate was washed with water, again filtered, and finally dried in a drying cabinet at 105° C.

2.1.2. Characterization

Sample No. 1 was compared with precipitated calcium carbonate produced by a process of the prior art, meaning the slaking of the burnt lime was done in water instead of an ammonium chloride solution resulting in the formation of calcium hydroxide.

The results are summarized in following table 1, wherein the brightness of the feed material was measured for a particle size of $d_{50}$=5 μm, while the final products are measured as received.

TABLE 1

| Sample | Tappi Brightness | Rx | Ry | Rz | Index |
|---|---|---|---|---|---|
| Sample 1 feed material | 65.8 | 80.1 | 72.2 | 65.4 | 19.1 |
| PCC (prior art) | 91.7 | 95.6 | 94.8 | 91.6 | 4.3 |
| Sample 1 final product (invention) | 96-98 | 96-98.8 | 96-98.7 | 96-98.1 | 0.6-1.5 |

Looking at these results, it is evident that the precipitated calcium carbonate produced according to the process of the present invention from a low quality natural calcium carbonate material has excellent brightness, which is even better than the precipitated calcium carbonate produced according to a process of the prior art.

These results were confirmed by further tests with samples 2 to 8, which were processed as described above and compared with the obtained precipitated calcium carbonate as summarized in the following table 2.

TABLE 2

| Sample | Tappi Brightness | Rx | Ry | Rz | Index |
|---|---|---|---|---|---|
| Sample No. 2 (feed) | 81.9 | 89.3 | 87.8 | 81.7 | 8.8 |
| Sample No. 2 (final product), $d_{50}$ = 4.8 µm | 97.5 | 98.6 | 98.5 | 97.5 | 1.2 |
| Sample No. 3 (feed) | 80.4 | 86.6 | 85.2 | 80.1 | 7.6 |
| Sample No. 3 (final product), $d_{50}$ = 2.2 µm | 96.7 | 98 | 97.8 | 96.6 | 1.4 |
| Sample No. 4 (feed) | 70.7 | 79.4 | 77.6 | 70.4 | 11.7 |
| Sample No. 4 (final product), $d_{50}$ = 4.8 µm | 97.8 | 96.5 | 98.4 | 97.7 | 0.9 |
| Sample No. 5 (feed) | 86.9 | 91.6 | 90.7 | 86.8 | 5.3 |
| Sample No. 5 (final product), $d_{50}$ = 6 µm | 96.4 | 98.2 | 97.9 | 96.3 | 2 |
| Sample No. 6 (feed) | 85.9 | 93 | 91.5 | 85.7 | 8 |
| Sample No. 6 (final product), $d_{50}$ = 14 µm | 95.7 | 97.7 | 97.3 | 95.6 | 2.2 |
| Sample No. 7 (feed) | 75.2 | 86.1 | 83.8 | 74.9 | 13.4 |
| Sample No. 7 (final product), $d_{50}$ = 12.4 µm | 94.5 | 95.5 | 95.4 | 94.4 | 1.2 |
| Sample No. 8 (feed) | 79.9 | 88.7 | 87 | 79.6 | 10.4 |
| Sample No. 8 (final product), $d_{50}$ = 2 µm | 97.8 | 98.5 | 98.4 | 97.7 | 0.8 |

2.1.3. Chemical Analysis

The elemental analysis of the dried product, as well as of the feed material and the reject of sample 3 was analysed by means of X-ray fluorescence (XRF ARL-9400, from Thermo-ARL). For the determination of loss on ignition and the specific surface area (measured using nitrogen and the BET method according to ISO 9277) standard lab methods were used (cf. table 3).

TABLE 3

| | Feed material [wt %] | Product [wt %] | Reject [wt %] |
|---|---|---|---|
| $SiO_2$ | 1.05 | <0.1 | 14.14 |
| $Al_2O_3$ | 0.47 | <0.1 | 5.94 |
| $Fe_2O_3$ | 0.13 | <0.04 | 1.76 |
| MgO | 0.31 | <0.1 | 4.34 |
| CaO | 96.42 | 55.45 | 37.87 |
| $Na_2O$ | <0.1 | <0.1 | <0.1 |
| $K_2O$ | 0.05 | <0.01 | 0.04 |
| $TiO_2$ | 0.02 | <0.01 | 0.21 |
| $P_2O_5$ | 0.15 | <0.01 | 2.00 |
| Loss on ignition | 1.29 | 44.63 | 24.56 |
| ppm: | | | |
| Y | 16 | 7 | 140 |
| Ba | 24 | 23 | 64 |
| Sr | 1096 | 112 | 5615 |
| Pb | 7 | 5 | 23 |
| Ni | 22 | 19 | 53 |
| Cr | 20 | 8 | 146 |
| Mn | 92 | <10 | 3090 |

From the above table it can be seen that the product obtained from the process according to the invention has a high chemical purity with respect to its calcium carbonate content (CaO+loss on ignition) of 99 to 100 wt %.

Particularly, comparing the $SiO_2$, $Al_2O_3$, $Fe_2O_3$, MgO, $P_2O_5$ contents of the raw material, the product and the reject, it can be found that the separation of the corresponding impurities can be achieved almost completely.

Also the amount of heavy metals like Y, Sr, Mn, and Cr can be significantly reduced in the product.

2.2. Preparation and Characterization of High Purity PCC Using Seed Crystals 2.2.1. Preparation In 7 technically scaled trials the method of the present invention was evaluated with respect to different feed materials and process parameters as mentioned in the below table.

Feed Material

Samples No. 9-13: Washing-Riesel 1-4 mm (marble) Gummed (Austria)

Samples No. 14-15: Chalk ordinaire Omey (France)

a) 2 Tons of the respective samples were calcined in a rotary kiln at a temperature of 1000° C. for 2 hours, to obtain comparable feed material for the slaking process.

b) 180 kg of the burnt lime obtained from the calcining step was fed into a slaking reactor (volume: 2.3 m³; diameter: 1.2 m; height: 2 m), which was previously fed with 360 kg ammonium chloride and 1800 kg of water. The reaction mixture was slaked under stirring at a temperature of 40° C. for half an hour. The reaction was completed, when the burnt lime was dissolved to a clear solution.

c) Subsequently, 15 ppm (based on CaO) of an anionic flocculant (Superfloc A-130 from Kemira) was added to the resulting reaction mixture in order to improve the separation of the insoluble components from the resulting solution. The separation was finally carried out by sedimentation and decanting the clear solution.

d) 600 l of resulting calcium chloride solution was fed into an Ultramill (volume: 700 l), and a defined amount of aragonitic seed crystals, as given in the table below was added thereto.

Subsequently, the calcium chloride solution was heated to the corresponding starting temperature, and a technical gas containing 20 vol. % of carbon dioxide, was fed from a storage tank under defined stirring power as mentioned in the table below and a flow rate of 100 m³/h. When the reaction was completed, which was determined by a final pH of 7, the precipitated calcium carbonate slurry was separated by filtration on a vacuum drum filter from Metso, the filter cake was washed with water and finally upconcentrated by a centrifuge to a final slurry.

The solids content in the precipitated calcium carbonate slurry is related to the recovery, whereas the solids content in the filter cake indicates the fineness of the final product.

The above procedure yielded PCCs having a BET surface of between about 4 and about 12 and having excellent optical properties as mentioned in the below table. R457 Tappi brightness and yellow index were determined by Datacolor measurements as mentioned above.

A comparison indicates that best results regarding fineness and brightness could be achieved with 2 wt % of aragonitic seeds, low precipitation starting temperature and high stirrer power.

It can be concluded, that too low concentrations of seed crystals enlarge the resulting size of precipitated crystals, while too high concentrations reduce viscosity and disturb gas transport in the reactor. Also higher stirring power and lower starting temperatures promote the formation of more and finer particles.

TABLE 4

| | Trial No. | | | | | | |
|---|---|---|---|---|---|---|---|
| | 9 | 10 | 11 | 12 | 13 | 14 | 15 |
| Feed material | Riesel | Riesel | Riesel | Riesel | Riesel | Chalk | Chalk |
| Seed crystals [wt % (based on CaO)] | 0 | 1 | 2 | 2 | 5 | 0 | 5 |
| Starting temperature [° C.] | 55 | 55 | 40 | 53 | 55 | 55 | 55 |
| Stirrer [% Power] | 75 | 75 | 75 | 50 | 70 | 75 | 70 |
| Solids content $CaCO_3$ slurry (before filtration) [wt %] | 7.1 | 8.1 | 8.9 | 6.0 | 12.4 | 9.3 | 9.2 |
| Solids content $CaCO_3$ filter cake [wt %] | 60.6 | 57.0 | 53.0 | 52.4 | 47.0 | 72.0 | 50.2 |
| BET-surface [$m^2/g$] | 4.2 | 4.8 | 11.8 | 6.4 | 6.5 | 3.5 | 12.5 |
| Datacolor R457/ Index | 92.3/ 3.6 | 95.5/ 1.7 | 96.4/ 1.1 | 93.3/ 3.0 | 95.9/ 1.2 | 92.9/ 3.1 | 81.2/ 9.5 |

The brightness (R457) of sample 15 was rather pure. This, however was due to an incomplete flocculation of the impurities in this sample. The brightness of this sample could be significantly improved by the addition of some more flocculant. In this case, however, sample 15 was used for the following experiments, in order to verify the efficiency of a subsequent microfiltration, which provided very good results, as well.

2.3. Preparation of High Purity PCC from Different Materials and Characterization with Respect to Improved Filtration In order to evaluate the influence of an improved filtration step after slaking the burnt lime, samples from above mentioned trials 13 and 15 were filtered again by use of a microfiltration unit with 0.2 μm PP membranes from Microdyn-Nadir.

Subsequently, the filtrate was precipitated in a lab unit as mentioned above with respect to example 1.

By separation of residual organic molecules and colloidal iron hydroxide impurities a further brightness increase and index reduction could be verified (cf. table 5).

By applying the micro filtration step also high pure aragonitic products could be gained. The purity was controlled by X-ray diffraction using a D8 XRD from Bruker in combination with Rietveld software Topas (cf. table 5).

TABLE 5

| | Brightness after microfiltration | | | XRD |
|---|---|---|---|---|
| | Tappi R457 | Ry | Index | Aragonit [%] |
| Sample No. 13 | 97.6 | 97.9 | 0.5 | 99.4 |
| Sample No. 15 | 97.5 | 97.9 | 0.6 | 99.5 |

The invention claimed is:

1. A process for the preparation of precipitated calcium carbonate comprising the steps of:
   a) providing and calcining calcium carbonate comprising material to obtain a reaction product comprising calcium oxide;
   b) slaking the reaction product obtained from step a) with an aqueous ammonium chloride solution;
   c) separating insoluble components from the calcium chloride solution obtained from step b);
   d) carbonating the calcium chloride solution obtained from step c) to form precipitated calcium carbonate;
   e) separating the precipitated calcium carbonate obtained from step d),
   wherein seed crystals are added to the calcium chloride solution obtained from step c) before precipitation.

2. The process according to claim 1, wherein the calcium carbonate comprising material of step a) is selected from the group consisting of precipitated calcium carbonate, a natural calcium carbonate mineral, marble, limestone, chalk, a mixed alkaline earth carbonate mineral comprising calcium carbonate, and dolomite.

3. The process according to claim 1, wherein the calcium carbonate comprising material of step a) is natural calcium carbonate mineral obtained from one or more of marble, limestone, chalk or mixture thereof.

4. The process according to claim 1, wherein the calcium carbonate comprising material has a minimum calcium carbonate content of at least 15 wt %.

5. The process according to claim 1, wherein the calcium carbonate comprising material has a minimum calcium carbonate content of at least 50 wt %.

6. The process according to claim 1, wherein the calcium carbonate comprising material has a minimum calcium carbonate content of at least 75 wt %.

7. The process according to claim 1, wherein the calcium carbonate comprising material has a minimum calcium carbonate content of at least 90 wt %.

8. The process according to claim 1, wherein the calcium carbonate comprising material has a minimum calcium carbonate content of at least 98 wt %.

9. The process according to claim 1, wherein the molar ratio of ammonium chloride to calcium oxide in step b) is from 1:1 to 8:1.

10. The process according to claim 1, wherein the molar ratio of ammonium chloride to calcium oxide in step b) is from 1.5:1 to 4:1.

11. The process according to claim 1, wherein the molar ratio of ammonium chloride to calcium oxide in step b) is from 2:1 to 3:1.

12. The process according to claim 1, wherein in step c), separation of insoluble components is carried out by screening, sedimentation and decanting, and/or filtration.

13. The process according to claim 1, wherein the insoluble components may be flocculated before their removal by addition of flocculants selected from the group consisting of high molecular flocculants, cationic flocculants, anionic flocculants, non-ionic flocculants, and copolymers based on polyacrylic acid.

14. The process according to claim 13, wherein in step c), the flocculant is added in an amount of from 1 to 50 ppm based on dry CaO.

15. The process according to claim 13, wherein in step c), the flocculant is added in an amount of from 2 to 40 ppm based on dry CaO.

16. The process according to claim 13, wherein in step c), the flocculant is added in an amount of from 3 to 25 ppm based on dry CaO.

17. The process according to claim 13, wherein in step c), the flocculant is added in an amount of from 5 to 15 ppm based on dry CaO.

18. The process according to claim 1, wherein in step d), the carbonation is carried out by feeding pure gaseous carbon dioxide or technical gases containing at least 10 vol.-% of carbon dioxide into the alkaline calcium chloride solution.

19. The process according to claim 1, wherein in step e), precipitated calcium carbonate obtained from step d) is separated from a mother liquor by filtration.

20. The process according to claim 1, wherein after step e), the precipitated calcium carbonate is washed with water.

21. The process according to claim 1, wherein after step e), the precipitated calcium carbonate is upconcentrated or dried.

22. The process according to claim 1, which is conducted as closed process with the reactants being recycled.

23. The process according to claim 1, which is conducted batch wise or as a continuous process.

24. The process according to claim 1, wherein the precipitated calcium carbonate contains less than 0.5 wt % impurities.

25. The process according to claim 1, wherein the precipitated calcium carbonate contains less than 0.3 wt % impurities.

26. The process according to claim 1, wherein the precipitated calcium carbonate contains less than 0.1 wt % impurities.

27. The process according to claim 1, wherein the precipitated calcium carbonate contains less than 0.05 wt % impurities.

28. The process according to claim 1, wherein the precipitated calcium carbonate has aragonitic, calcitic, or vateritic crystal structure, or any mixture thereof.

29. The process according to claim 1, wherein the precipitated calcium carbonate has a TAPPI brightness of at least 88.

30. The process according to claim 1, wherein the precipitated calcium carbonate has a TAPPI brightness of at least 90.

31. The process according to claim 1, wherein the precipitated calcium carbonate has a TAPPI brightness of at least 92.

32. The process according to claim 1, wherein the precipitated calcium carbonate has a TAPPI brightness from 95 to 99.

33. The process according to claim 1, wherein the precipitated calcium carbonate has a luminous reflectance factor $R_y$ of at least 90.

34. The process according to claim 1, wherein the precipitated calcium carbonate has a luminous reflectance factor $R_y$ of at least 92.

35. The process according to claim 1, wherein the precipitated calcium carbonate has a luminous reflectance factor $R_y$ of at least 95.

36. The process according to claim 1, wherein the precipitated calcium carbonate has a luminous reflectance factor $R_y$ from 96 to 99.

37. The process according to claim 1, wherein the precipitated calcium carbonate has a yellow index of from 0.5 to 6.

38. The process according to claim 1, wherein the precipitated calcium carbonate has a yellow index of from 0.7 to 3.

39. The process according to claim 1, wherein the precipitated calcium carbonate has a yellow index of from 1 to 2.

40. The process according to claim 1, wherein the precipitated calcium carbonate has a weight median diameter $d_{50}$ of not more than 20 μm.

41. The process according to claim 1, wherein the precipitated calcium carbonate has a weight median diameter $d_{50}$ of not more than 10 μm.

42. The process according to claim 1, wherein the precipitated calcium carbonate has a weight median diameter $d_{50}$ of not more than 5 μm.

43. The process according to claim 1, wherein the precipitated calcium carbonate has a weight median diameter $d_{50}$ of not more than 2 μm.

44. The process according to claim 1, wherein the precipitated calcium carbonate has a weight median diameter $d_{50}$ of not more than 1 μm.

* * * * *